(12) United States Patent
Li et al.

(10) Patent No.: US 12,335,772 B2
(45) Date of Patent: Jun. 17, 2025

(54) METHOD FOR TRANSMITTING DATA AND TERMINAL DEVICE

(71) Applicant: GUANGDONG OPPO MOBILE TELECOMMUNICATIONS CORP., LTD., Guangdong (CN)

(72) Inventors: Haitao Li, Dongguan (CN); Yang Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 367 days.

(21) Appl. No.: 17/890,177

(22) Filed: Aug. 17, 2022

(65) Prior Publication Data
US 2023/0075039 A1 Mar. 9, 2023

Related U.S. Application Data

(63) Continuation of application No. PCT/CN2020/075897, filed on Feb. 19, 2020.

(51) Int. Cl.
*H04W 28/02* (2009.01)
*G06N 3/02* (2006.01)

(52) U.S. Cl.
CPC .......... *H04W 28/0263* (2013.01); *G06N 3/02* (2013.01); *H04W 28/0268* (2013.01)

(58) Field of Classification Search
CPC . H04W 28/0263; H04W 28/0268; G06N 3/02
USPC ........................................ 370/329
See application file for complete search history.

(56) References Cited

U.S. PATENT DOCUMENTS

| 5,937,053 | A | * | 8/1999 | Lee | H04Q 3/665 |
| | | | | | 379/221.09 |
| 5,940,759 | A | * | 8/1999 | Lopez-Torres | H04Q 3/0029 |
| | | | | | 455/433 |
| 11,758,615 | B2 | * | 9/2023 | Zhang | H04L 69/22 |
| | | | | | 370/329 |
| 2017/0289893 | A1 | | 10/2017 | Manna et al. | |

(Continued)

FOREIGN PATENT DOCUMENTS

| CA | 3238266 A1 * | 5/2023 | .......... H04L 1/1812 |
| CN | 110024466 A | 7/2019 | |

(Continued)

OTHER PUBLICATIONS

3GPP TS 38.300 V16.0.0 (Dec. 2019), 3rd Generation Partnership Project; Technical Specification Group Radio Access Network; NR; NR and NG-RAN Overall Description; Stage 2 (Release 16), entire document.

(Continued)

*Primary Examiner* — Anthony Mejia
(74) *Attorney, Agent, or Firm* — Ladas & Parry, LLP

(57) ABSTRACT

A method for transmitting data and a terminal device are provided. The method comprises operations as follows. A terminal device determines to activate a first data radio bearer (DRB) and transmit target data over the first DRB, The first DRB is one of a plurality of DRBs, and the target data is data obtained by performing through the terminal device on the basis of a first data processing mode, or data obtained by processing, through the terminal device, N layers in the first data processing mode, N being an integer greater than or equal to 1.

18 Claims, 15 Drawing Sheets

(56) References Cited

U.S. PATENT DOCUMENTS

| | | | |
|---|---|---|---|
| 2018/0084564 A1 | 3/2018 | Xu et al. | |
| 2019/0357229 A1 | 11/2019 | Xu et al. | |
| 2020/0045766 A1 | 2/2020 | Kim et al. | |
| 2020/0205209 A1* | 6/2020 | Pan ........................ | H04W 4/40 |
| 2020/0267753 A1 | 8/2020 | Adjakple et al. | |
| 2023/0318757 A1* | 10/2023 | Lee ........................ | H04L 1/189 |
| | | | 370/329 |

FOREIGN PATENT DOCUMENTS

| | | | | |
|---|---|---|---|---|
| CN | 110401604 | A | 11/2019 | |
| CN | 110769461 | A | 2/2020 | |
| CN | 110795235 | A | 2/2020 | |
| EP | 3294002 | A1 | 3/2018 | |
| EP | 3668168 | A1 * | 6/2020 | ........ H04W 28/0263 |
| WO | 2021163931 | A1 | 8/2021 | |

OTHER PUBLICATIONS

Supplementary European Search Report in the corresponding European application No. 20919559.3, mailed on Jan. 16, 2023.
International Search Report in the international application No. PCT/CN2020/075897, mailed on Nov. 11, 2020.
Written Opinion of the International Search Authority in the international application No. PCT/CN2020/075897, mailed on Nov. 11, 2020.

* cited by examiner

A terminal device determines to activate a first DRB, and transmits target data on the first DRB

FIG. 2

A network device receives target data transmitted by a terminal device on a first DRB ~31

FIG. 3

METHOD FOR TRANSMITTING DATA AND TERMINAL DEVICE

CROSS-REFERENCE TO RELATED APPLICATION

This is a continuation application of International Patent Application No. PCT/CN2020/075897, filed on Feb. 19, 2020, the disclosure of which is hereby incorporated by reference in its entirety.

BACKGROUND

In the related art, a Quality of Service (QoS) data flow is triggered and created by a core network. If modification is required, the terminal needs to send a request message (PDU Session Modification Request) to modify a QoS parameter related to the QoS flow, and then map the QoS data flow to the Data Radio Bearer (DRB) for transmission. For big data services, for example services related to the neural network model, the terminal device needs to timely regulate to a suitable QoS data flow and a DRB suitable for transmission requirements of the terminal device, which becomes a problem to be solved.

SUMMARY

The present disclosure relates to the field of communications, and in particular to a method for transmitting data and a terminal device.

To solve the above technical problem, the embodiments of the present disclosure provide a method for transmitting data and a terminal device.

A first aspect of the embodiments of the present disclosure provides a method for transmitting data, the method includes operations as follows.

A terminal device determines to activate a first DRB, and transmits target data on the first DRB, The first DRB is one of a plurality of DRBs.

The target data is data obtained by processing through the terminal device based on a first data processing manner, or the target data is data obtained by processing, through the terminal device, N layers in the first data processing manner, where N is an integer greater than or equal to 1.

A second aspect of the embodiments of the present disclosure provides a method for transmitting data, and the method includes an operation as follows.

A network device receives target data transmitted by a terminal device, which includes: a processor, a transceiver and a memory for storing a computer program executable by the processor.

The processor is configured to invoke and execute the computer program stored in the memory to determine to activate a first Data Radio Bearer (DRB), and control the transceiver to transmit target data on the first DRB. The first DRB is one of a plurality of DRBs. The target data is data obtained by processing through the terminal device based on a first data processing manner, or the target data is data obtained by processing, through the terminal device, N layers in the first data processing manner, wherein N is an integer greater than or equal to 1.

BRIEF DESCRIPTION OF THE DRAWINGS

FIG. 2 is a first schematic flowchart of a method for transmitting data according to an embodiment of the present disclosure.

FIG. 3 is a second schematic flowchart of a method for transmitting data according to an embodiment of the present disclosure.

DETAILED DESCRIPTION

For making the characteristics and technical contents of the embodiments of the present disclosure understood in more detail, implementation of the embodiments of the present disclosure is described below in combination with the drawings in detail. The drawings are only for description as references and not intended to limit the embodiments of the present disclosure.

The technical solutions in the embodiments of the disclosure are described below in combination with the drawings in the embodiments of the disclosure. It is apparent that the described embodiments are only a part rather than all of the embodiments of the disclosure. All other embodiments obtained by those of ordinary skill in the art based on the embodiments in the disclosure without creative work fall within the scope of protection of the disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
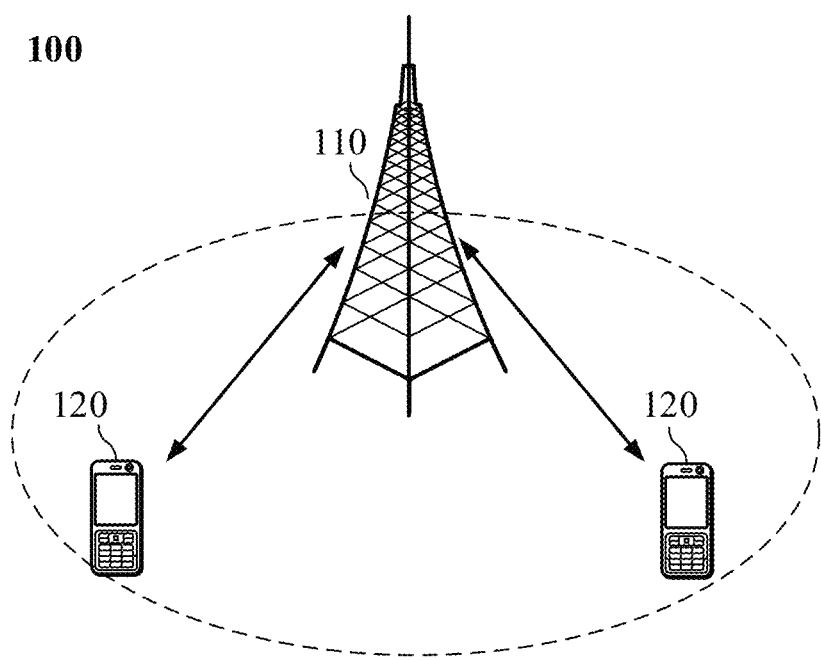
FIG. 1 is a first schematic diagram of architecture of a communication system according to an embodiment of the present disclosure.

Exemplarily, a communication system 100 to which the embodiment of the present disclosure is applied may be illustrated in FIG. 1. The communication system 100 may include a network device 110, which may be a device that communicates with a User Equipment (UE) 120 (or referred to as a communication terminal device, a terminal device). The network device 110 may provide communication coverage for a particular geographic area and may communicate with UEs located within the coverage area. Optionally, the network device 110 may be a network device (Base Transceiver Station, BTS) in a GSM system or a CDMA system, may be a network device (NodeB, NB) in a WCDMA system, may be an evolutional network device (Evolutional Node B, eNB or eNodeB) in an LTE system, or may be a radio controller in a Cloud Radio Access Network (CRAN). Alternatively, the network device may be a mobile switching center, a relay station, an access point, an in-vehicle device, a wearable device, a hub, a switch, a bridge, a router, a network-side device in the 5G network, a network device in a future evolved Public Land Mobile Network (PLMN), or the like.

The communication system 100 further includes at least one UE 120 within the coverage of the network device 110. As used herein, the "UE" includes, but is not limited to be connected via a wired line, such as via a Public Switched Telephone Networks (PSTN), a Digital Subscriber Line (DSL), a digital cable, a direct cable connection; and/or another data connection/network; and/or via a wireless interface, for example, for a cellular network, a Wireless Local Area Network (WLAN), a digital television network such as a DVB-H network, a satellite network, a AM-FM broadcast transmitter; and/or means of another UE configured to receive/transmit communication signals; and/or an Internet of Things (IoT) device. The UE configured to communicate through a wireless interface may be referred to as a "radio communication terminal device", a "radio terminal device" or a "mobile terminal device".

Optionally, Device to Device (D2D) communication may be performed between the UEs 120.

It should be understood that the terms "system" and "network" are used interchangeably herein. The term "and/or" in the disclosure means only an association relationship describing associated objects and represents that three relationships may exist. For example, A and/or B may represent three conditions: i.e., only A, both A and B and only B. In addition, character "/" in the disclosure usually represents that previous and next associated objects form an "or" relationship.

For making the characteristics and technical contents of the embodiments of the present disclosure understood in more detail, implementation of the embodiments of the present disclosure are described below in combination with the drawings in detail. The drawings are only adopted for description as references and not intended to limit the embodiments of the present disclosure.

Based on this, the embodiment of the present disclosure provides a method for transmitting data. As shown in FIG. 2, the method includes operation as follows.

At 21, a terminal device determines to activate a first DRB, and transmits target data on the first DRB.

The first DRB is one of a plurality of DRBs.

The target data is data obtained by processing through the terminal device based on a first data processing manner, or the target data is data obtained by processed, through the terminal device, N layers in the first data processing manner. N is an integer greater than or equal to 1.

The embodiment of the present disclosure further provides a method for transmitting data. As shown in FIG. 3, the method includes operations as follows.

At 31, a network device receives target data transmitted by a terminal device on a first DRB.

The first DRB is one of a plurality of DRBs.

The target data is data obtained by processing through the terminal device based on a first data processing manner, or the target data is data obtained by processed, through the terminal device, N layers in the first data processing manner. N is an integer greater than or equal to 1.

The terminal device described in the embodiment may be a terminal device capable of performing the first data processing manner, such as a neural network model (or calculation) or an AI model (or an AI algorithm). The network device may be a network-side access network device, such as a base station (a gNB, an eNB, etc.), or may be a core network device. Processing of different network devices are described below with reference to examples.

In the embodiment, the first data processing manner may be one of a plurality of data processing manners that can be performed by the terminal device Further, the data processing manner may be an AI algorithm or a Machine Learning (ML) model.

Figure 4:
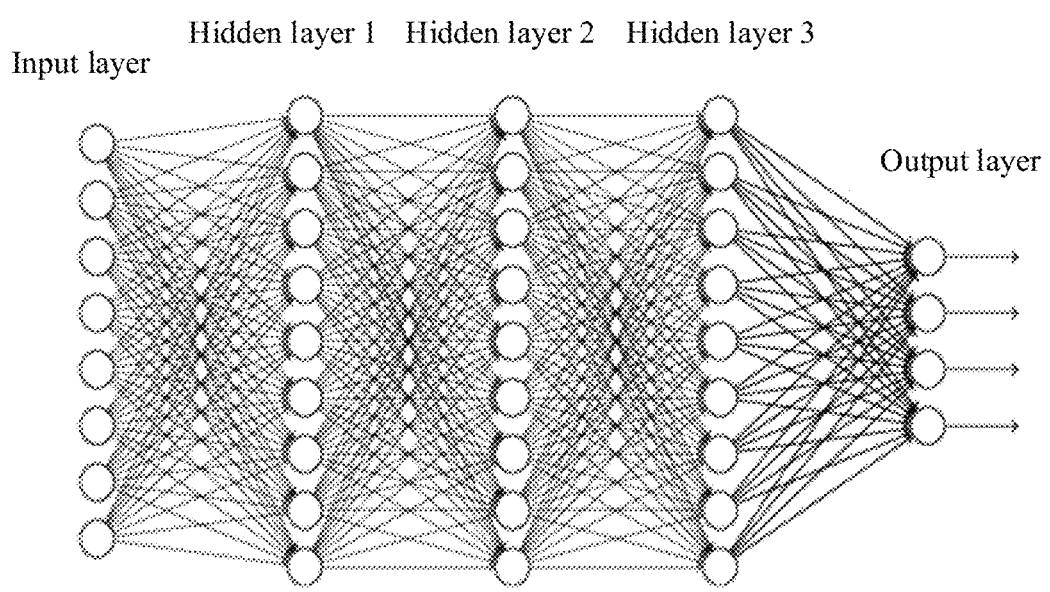
FIG. 4 is schematic diagrams of several scenarios of layering processing of an Artificial Intelligence (AI) model.

The most widely used type of AI/ML model is a Deep Neural Network (DNN). As shown in FIG. 4, according to a division of positions of different layers of the DNN, neural network layers inside the DNN can be divided into three layers: an input layer, a hidden layer and an output layer. As shown in the example, generally the first layer is the input layer, the last layer is the output layer, and the middle layers are all hidden layers. In order to improve the effect of the big data analysis and user experience, a multi-level AI/ML mode may be considered, that is, the big data analysis is distributed to be performed by the network element at the network-side and the terminal.

The N layers in the first data processing manner processed by the terminal device may be the number of layers processed by the terminal device on the terminal device side in an AI/ML algorithm or model or neural network.

Specifically, in order to improve the effect of big data analysis and user experience, a multi-level AI/ML mode may be considered, that is, the big data analysis is distributed to be performed by the network element at the network-side and the terminal.

Figure 5:
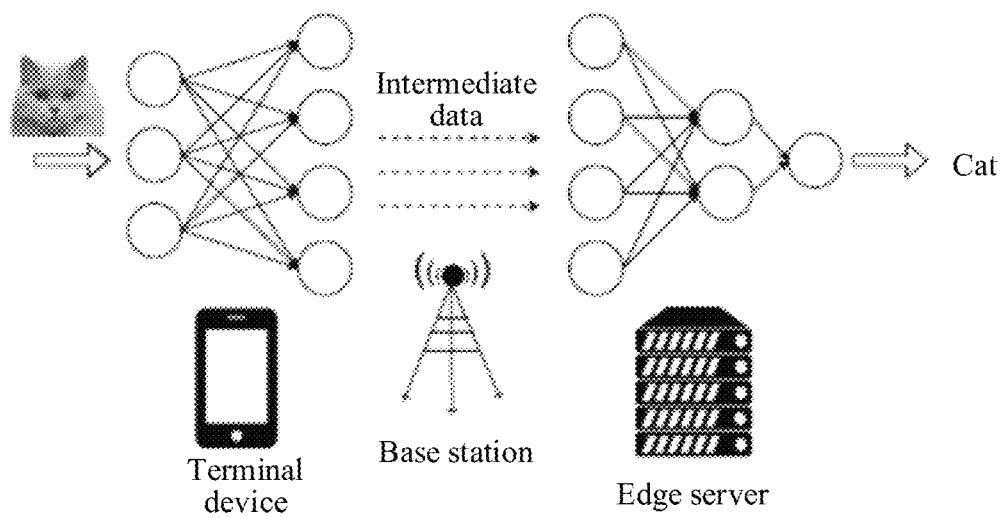
FIG. 5 is schematic diagrams of several scenarios of layering processing of an AI model.

In an example, as shown in FIG. 5, the terminal performs partial calculation on the data to form intermediate data, and then sends the data to an edge server through a mobile network (such as a base station in an access network) for further computation. This helps to share the computation workload and protect the privacy of users in the terminal.

Figure 6:
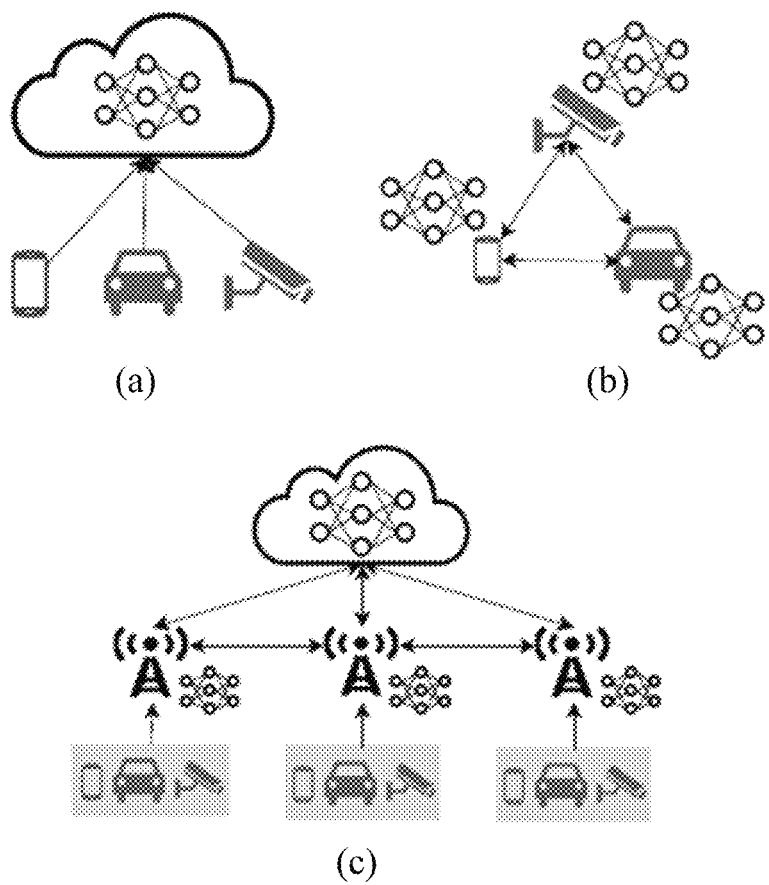
FIG. 6 is schematic diagrams of several scenarios of layering processing of an AI model.
Figure 7:
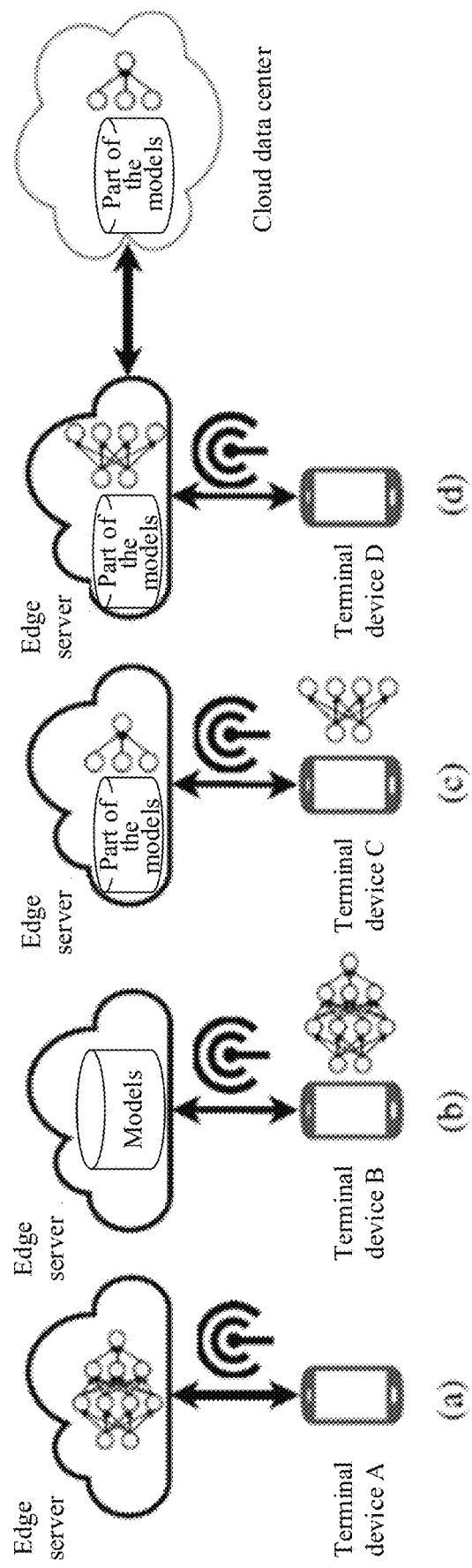
FIG. 7 is schematic diagrams of several scenarios of layering processing of an AI model.

In a scenario of multiple terminals, there are many options for the big data analysis. As shown in FIG. 6, the scenario a) is a centralized scenario in which after all terminals report the required data, the big data analysis is all performed at the network server. The scenario b) is a fully distributed scenario in which different terminals locally analyze the collected data. The scenario c) is a hybrid scenario in which after a part of the analysis of the collected data is performed locally by the terminal, the terminal sends a result to the network server for further calculation and analysis. Furthermore, data interaction between the terminal device and the network device to complete big data analysis or result sharing may be introduced in the scenarios b) and c). For example, as shown in FIG. 7, the big data analysis may be shared among a terminal device, an edge server and a cloud server, or may be performed on only one or two of them.

Therefore, different AI/ML models and calculation workload may be allocated to the terminal device as needed, and the terminal device may complete the calculation and successfully send it to the network server within a required time.

In the embodiment, the first data processing manner is determined according to at least one of a current operation capability or a current link quality of the terminal device, or is indicated by a network device. and/or the number of layers processed by the terminal device in the first data processing manner is determined according to at least one of a current operation capability or a current link quality of the terminal device, or is indicated by the network device.

That is, the first data processing manner or the number of layers processed by the terminal device in the first data processing manner may be determined by the terminal device or may be indicated by the network device.

The above two cases are described with reference to examples below.

First Example

The terminal device determines the number of AI operation layers to activate the DRB.

Figure 8:
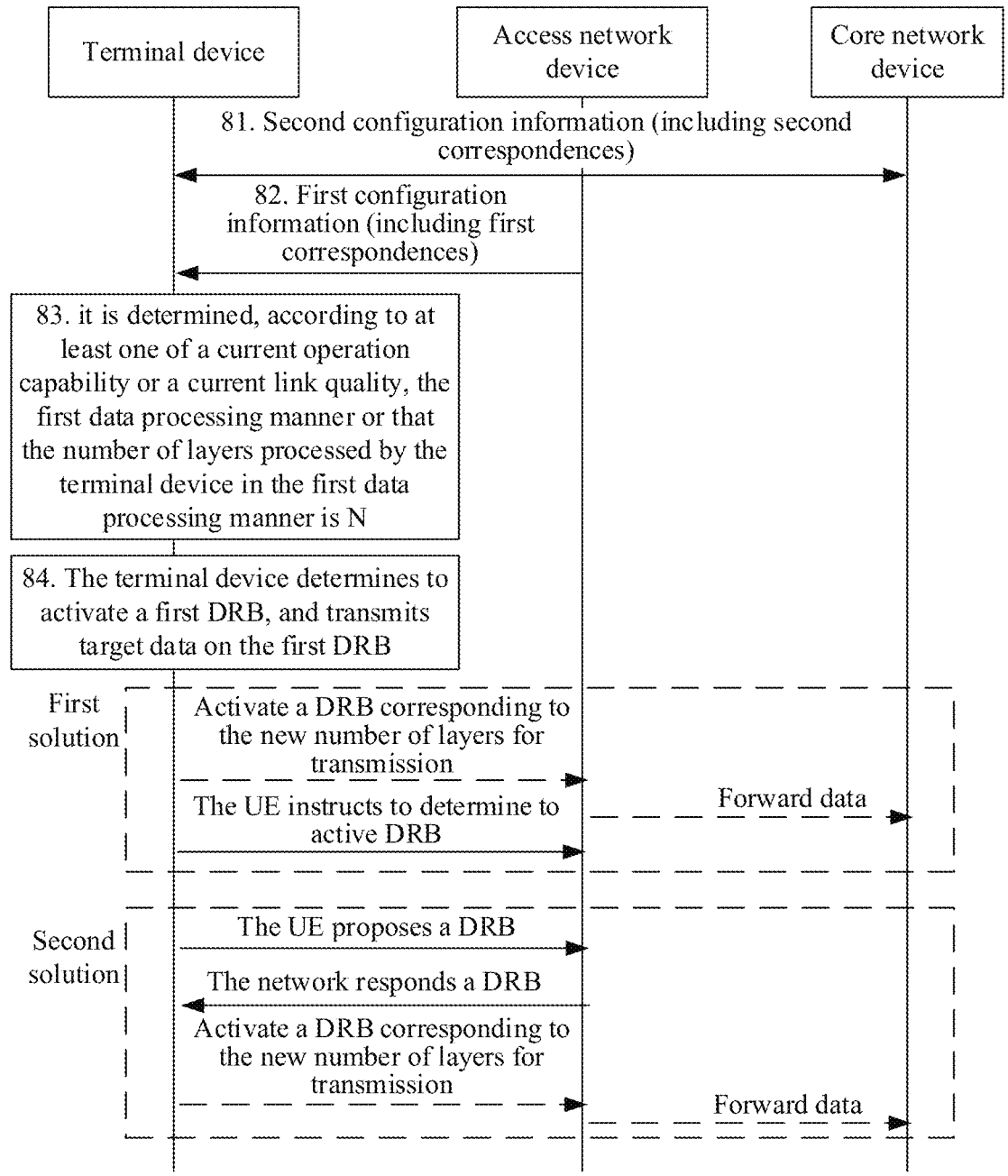
FIG. 8 is a third schematic flowchart of a method for transmitting data according to an embodiment of the present disclosure.

The solution provided by the example is described in detail with reference to FIG. 8.

At 81, the network device is a core network device, and the terminal device receives second configuration information sent by the core network device. The second configuration information includes second correspondences.

The second correspondences at least include correspondences between the first data processing manner and one or more QoS data flows, and/or correspondences between different numbers of layers processed by the terminal device in the first data processing manner and different QoS data flows.

Specifically, for each AI model or AI task, the network device (Session Management Function (SMF) at the core network side) establishes a plurality of QoS data flows, and the data flows correspond to different QoS parameters. Further, for the multi-layer AI model/task, the data flows correspond to different numbers of AI operation layers on the UE side.

At 82, the network device is an access network device, and the terminal device receives first configuration information sent by the network device (the access network device). The first configuration information includes first correspondences.

The network device is the access network device.

The first correspondences include a correspondence between at least one DRB and related information of a data processing manner capable of being transmitted by the DRB; and/or a correspondence between the at least one DRB and the number of layers of processing in a data processing manner supported by the DRB.

In addition, the first correspondences may further include a correspondence between the at least one DRB and one or more QoS data flows. Different DRBs correspond to different QoS data flows.

For example, for a terminal device in a connected state, the access network device, such as a gNB, configures a Service Data application Protocol (SDAP) attribute of a DRB through the first configuration information, to indicate AI model data which the DRB can transmit (it may be understood that there may be multiple DRBs, and the first correspondences in the first configuration information indicate a respective AI model which each of the multiple DRBs can transmit), besides the QoS flow. Further, if the AI model is applicable to the multi-layer operation structure, the SDAP attribute further indicates that the first correspondences may include a number of operation layers on the UE side in the AI model which each of the multiple DRBs can transmit (that is, the first correspondences may include a correspondence between each of the multiple DRBs and the number of layers processed by the terminal device in the data processing manner supported by the DRB). The related information of the data processing manner (such as the AI model) includes at least one of: a type of a neural network model, such as a DNN, a Recycle Neural Network (RNN), a Convolution Neural Network (CNN); an algorithm identifier corresponding to the neural network model; service information corresponding to the neural network model, the service information may be a service identifier; or version information corresponding to the neural network model.

The number of operation layers on the terminal device side of the supported AI model may be one or more layers in the AI model. That is, the first correspondences may include that the number of layers processed by the terminal device in a data processing manner supported by a DRB is N, and N is greater than or equal to 1.

At 83, the terminal device determines, according to at least one of a current operation capability or a current link quality, the first data processing manner or that a number of layers processed by the terminal device in the first data processing manner is N.

The operation capability of the terminal device may be determined by a storage capacity, an operation speed, a processing capability and the like of the terminal device. The storage capacity may include a memory capacity, the memory may be a memory directly accessible by the CPU, and the size of the memory capacity may indicate the ability that a computer or a terminal device stores information in a timely manner. The processing capability and the operation speed may be related to both the CPU and the memory, and the operation speed is used to represent instructions that can be processed per second.

Accordingly, the current operation capability of the terminal device is the current remaining storage capacity of the terminal device, and/or the current processing speed of the terminal device, and may be for example, the current remaining computing capability of the CPU and/or the current remaining value of the memory capacity, and other indexes. As long as the indexes can indicate the current operation capability of the terminal device, the indexes are within the protection scope of the example. No more exhaustive list here.

The current link quality of the terminal device may be a current channel quality detected by the terminal device. A result for detecting the channel quality may be represented by at least one of a CSI measurement result, a Reference Signal Receiving Power (RSRP), a Received Signal Strength Indicator (RSSI), a Reference Signal Receiving Quality (RSRQ), and a Signal to Reference Ratio (SINR). The detection results may be obtained by measuring a reference signal transmitted by the network device, and are not described in detail herein.

In the example, how the terminal device determines, according to at least one of the current operation capability or the current link quality, the first data processing manner or that the number of layers processed by the terminal device in the first data processing manner is N may include operations as follows.

In a case, according to the current operation capability and the correspondences between the operation capabilities and the data processing manners, one of a plurality of data processing manners supported by the terminal device is determined to be the first data processing manner, or the number of layers processed by the terminal device in the first data processing manner is N.

The correspondences between the operation capabilities and the data processing manners may be preset in the terminal device, or may be configured by the network device for the terminal device. The operation capability may be expressed in the form of an operation capability range (or level). For example, a data processing manner 01 corresponds to an operation capability comprising the remaining memory capacity between A~B; and a data processing manner 02 corresponds to an operation capability comprising the remaining memory capacity between B~C. Alternatively, there may be a data processing manner 03, which corresponds to an operation capability comprising the remaining memory capacity between C-D and the computing capability between 1-2, and the like.

The terminal device can determine to use the first data processing manner of the plurality of data processing manners according to the current operation capability of the terminal and the above correspondences.

Alternatively, it is determined according to the current operation capability and the correspondences between the operation capabilities and numbers of layers in processing of the first data processing manner, to apply one of the plurality of data processing manners supported by the terminal device as the first data processing manner, and that the number of layers processed by the terminal device in the first data processing manner is N.

Similarly to the foregoing, the correspondences between the operation capabilities and the numbers of layers processed in the first data processing manner may be preset by the terminal device, or may be configured by the network device for the terminal device. The above application mode may also include that the terminal device performs match based on the current operation capability of the terminal device and the above-mentioned correspondences, to obtain a corresponding number N of layers in the first data processing manner which the terminal device can perform based on the current processing capability.

In another case, the terminal device may determine the first data processing manner to be used by the terminal device or the N layers processing in the first data processing manner to be performed by the terminal device, according to the combination of the current link quality, the correspondences between the link qualities and the numbers of processing layers or the correspondences between the link qualities and the processing manners.

In this case, the above correspondences may also be configured by network device or preset by the terminal device.

In addition, the link quality may be divided into multiple ranges or levels, and different ranges or levels correspond to different processing layers in the first processing manner, or different ranges or levels correspond to different data processing manners. Details are not described herein.

In still another case, the above two cases may be used together, and the preset correspondences may include the data processing manners or numbers of processing layers in a data processing manner corresponding to the operation capability ranges and the link quality ranges.

Accordingly, the terminal device obtains the current operation capability and the current link quality, to obtain, in combination with the above correspondences, the first data processing manner used by the terminal device, or the number N of layers processed by the terminal device in the first data processing manner.

Based on the foregoing, the processing performed in the terminal device in the operation is described below.

The application layer of the terminal device determines, according to at least one of the current operation capability or the current link quality, the first data processing manner or that the number of layers processed by the terminal device in the first data processing manner is N. The application layer of the terminal device send, to the access layer, the first data processing manner or the number N of layers processed by the terminal device in the first data processing manner.

In addition, in this case, the method may further include: the terminal device send, to a network device, the first data processing manner or the number N of layers processed by the terminal device in the first data processing manner.

Accordingly, the network device determines, according to that the number N of layers processed by the terminal device in the first data processing manner, that a number of layers in the first data processing manner to be processed by the network device is M. M is an integer greater than or equal to 1, and the M layers do not overlap with the N layers.

That is, the network device may determine, according to the received number of layers processed by the terminal device in the first data processing manner and the total number of layers included in the first data processing manner, the number of layers to be processed by the network device (such as the access network device) in the current processing or calculation.

For example, the terminal device indicates to the network device that the terminal device processes the first to the third layers in the AI model. After receiving the indication, the network device determines, according to the total number such as 9 of layers of the AI model and the number 3 of layers processed and indicated by the terminal device, that the network device needs to process the remaining fourth to ninth layers in the current operation, that is, a total of 6 layers of processing.

For example, the application layer on the terminal device side determines the number of layers participating in the AI operation according to the current operation capability and the link quality (or channel attribute) fed back by the current access layer, and indicates the AI model and information about the number of the operation layers to the access layer when sending the AI data to the access layer, and indicate the information about the number of the operation layers and the AI model of the AI data to the network side simultaneously.

At 84, the terminal device determines to activate a first DRB, and transmits a target data on the first DRB.

Specifically, the access layer on the terminal device side may perform the following two processing solutions according to the received first data processing manner or the number N of layers processed by the terminal device in the first data processing manner (that is, according to the AI model and the information about the number of the operation layers).

In the first solution, the terminal device selects the first DRB from the plurality of DRBs according to the first data processing manner or the number N of layers processed by the terminal device in the first data processing manner, and first correspondences.

That is, the terminal device determines to use the first DRB for transmission according to the SDAP configuration (specifically, according to the first correspondences therein) sent by the network side previously, thereby ensuring that different QoS flows under division of different layer are mapped to specific DRBs, and realizing the QoS differential transmission.

The method may further include an operation that the terminal device sends third indication information to the network device. The third indication information includes the first DRB to be activated selected by the terminal device.

The first indication information may be carried by dedicated signaling, for example, Radio Resource Control (RRC) dedicated signaling, or a Medium Access Control Control Element (MAC CE). or Uplink Control Information (UCI), or the like.

It is understood that the activated first DRB is correlated to at least one of the current operation capability or the current link quality of the terminal device.

In a second solution, the terminal device selects a candidate DRB from the plurality of DRBs according to the first data processing manner or the number N of layers processed by the terminal device in the first data processing manner N, and first correspondences, and sends the candidate DRB to the network device.

The terminal device receives first indication information sent by the network device. The first indication information includes the first DRB, and the first indication information is carried by RRC signaling, an MAC CE, or a Physical Downlink Control Channel (PDCCH).

That is, the terminal device determines a recommended value of the DRB according to the SDAP configuration (specifically, the first correspondences) previously sent by the network side, and indicates the recommended DRB (i.e., the candidate DRB) to the network device.

Then, the terminal device receives the first indication information responded by the network device, and determines the first DRB to be finally used according to the first indication information.

In this operation, the network device may be an access network device.

The terminal device may send the candidate DRB to the network device through dedicated signaling, for example, RRC dedicated signaling/a MAC CE/UCI, or the like.

In addition, the first DRB fed back by the network device and the candidate DRB may be the same or different. The network device may further select the first DRB for the terminal device in combination with the current link quality or the like. Since the network device also has a processing capability and detects the link, the network device may allocate a first DRB more suitable for the current communication condition to the terminal device.

Further, the example may further include an operation that the terminal device selects a first QoS data flow for transmitting the target data from a plurality of QoS data flows according to the first data processing manner or the number N of layers processed by the terminal device in the first data processing manner, and second correspondences.

The terminal device maps the first QoS data flow to the first DRB.

The second correspondences are already described in the foregoing operation 81, and are not described herein again.

That is, the terminal device may first determine the QoS data flow according to the first data processing manner or the number N of layers processed by the terminal device in the first data processing manner which is determined by the terminal device, and then map the determined QoS data flow to the determined first DRB.

Finally, the target data generated in the first data processing manner is transmitted through the first DRB, or the target data obtained after the terminal device performs N layers processing in the first data processing manner is transmitted through the first DRB.

Figure 9:
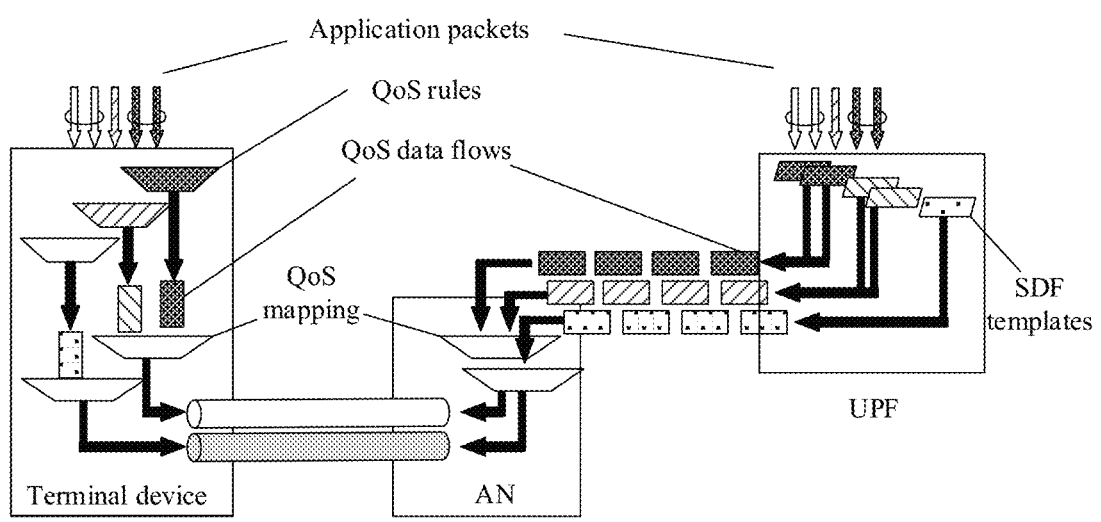
FIG. 9 is a schematic diagram of QoS mapping processing.

The mapping relationship between the QoS data flow and the DRB is described as follows. For example, referring to FIG. 9, in order to be able to transmit user plane data in a mobile communication network, one or more QoS flows (data flows) are established, and different data flows correspond to different QoS parameters. As an important measurement of communication quality, QoS parameters are usually used to indicate the characteristics of the QoS flows. The QoS parameters include, but are not limited to, at least one of: a 5G QoS Index (5QI), Allocation and Retention Priority (ARP), a Guaranteed Flow Bit Rate (GFBR), a Maximum Flow Bit Rate (MFBR), an Uplink or Downlink maximum packet loss rate, End-to-End Packet Delay Budget (PDB), Access Network (AN)-PDB, a packet error rate, packet priority, an average window, resource allocation, a maximum data burst capacity, UE-Aggregate Maximum Bit Rate (AMBR), session-AMBR.

In the current mechanism, the QoS Flow is triggered and established by an SMF, and the terminal sends a request message (PDU Session Modification Request) to modify the QoS parameters of the related QoS flow, the packet filter, or request to establish a new QoS flow. That is, when a terminal application needs a new QoS, a session modification process is performed, and must be confirmed by the network. This process takes a long time, and cannot guarantee that the modification is successful. Therefore, the behavior of the application is affected, that is, the application cannot accurately determine whether and how long the desired communication quality can be used, which may greatly affect a lot of real-time services, such as machine learning and neural network analysis.

At the access network, data is transmitted through the DRB. In particular, the gNB maps one or more specific SDAPs of a specific PDU session to a certain DRB by configuring the SDAP attribute of the DRB. One QoS flow of one PDU session can only be mapped to one DRB.

In the example, an example of an extended SDAP configuration is described as follows. In addition to a PDU-session field, an sdap-HeaderDL (SDAP downlink header field), an sdap-HeaderUL (SDAP uplink header field), a defaultDRB field, a mappedQoSFlowtoAdd (QoS data flow add mapping relationship), and a mappedQoS-FlowsToRelease (QoS data flow release mapping relationship) field, the following additional contents are contained a MappedAi-Model (AI model correspondence), and specific information of the AI model, such as an ai-ModelID (identification information of the AI model) and an ai-layer (for identifying the number of layers in the AI model processed by the terminal device), specifically:

```
SDAP-Config ::=         SEQUENCE {
    pdu-Session             PDU-SessionID,
    sdap-HeaderDL           ENUMERATED {present, absent},
    sdap-HeaderUL           ENUMERATED {present, absent},
    defaultDRB              BOOLEAN,
```

```
  mappedQoS-FlowsToAdd        SEQUENCE (SIZE (1..maxNrofQFIs)) OF QFI
OPTIONAL, -- Need N
  mappedQoS-FlowsToRelease    SEQUENCE (SIZE (1..maxNrofQFIs)) OF QFI
OPTIONAL, -- Need N
  ...
  [[
  MappedAi-Model   SEQUENCE (SIZE (1..maxNrofAIModels)) OF AI-Model
OPTIONAL, -- Need N
  ]]
  }
  AI-Model ::=              SEQUENCE {
  ai-ModelID                   AI-ModelID;
  ai-layer                     SEQUENCE (SIZE (1..maxNrofLayers)) OF Layer
OPTIONAL, -- Need N
  }
```

In a second example, the network side determines the number of AI layers.

Figure 10:
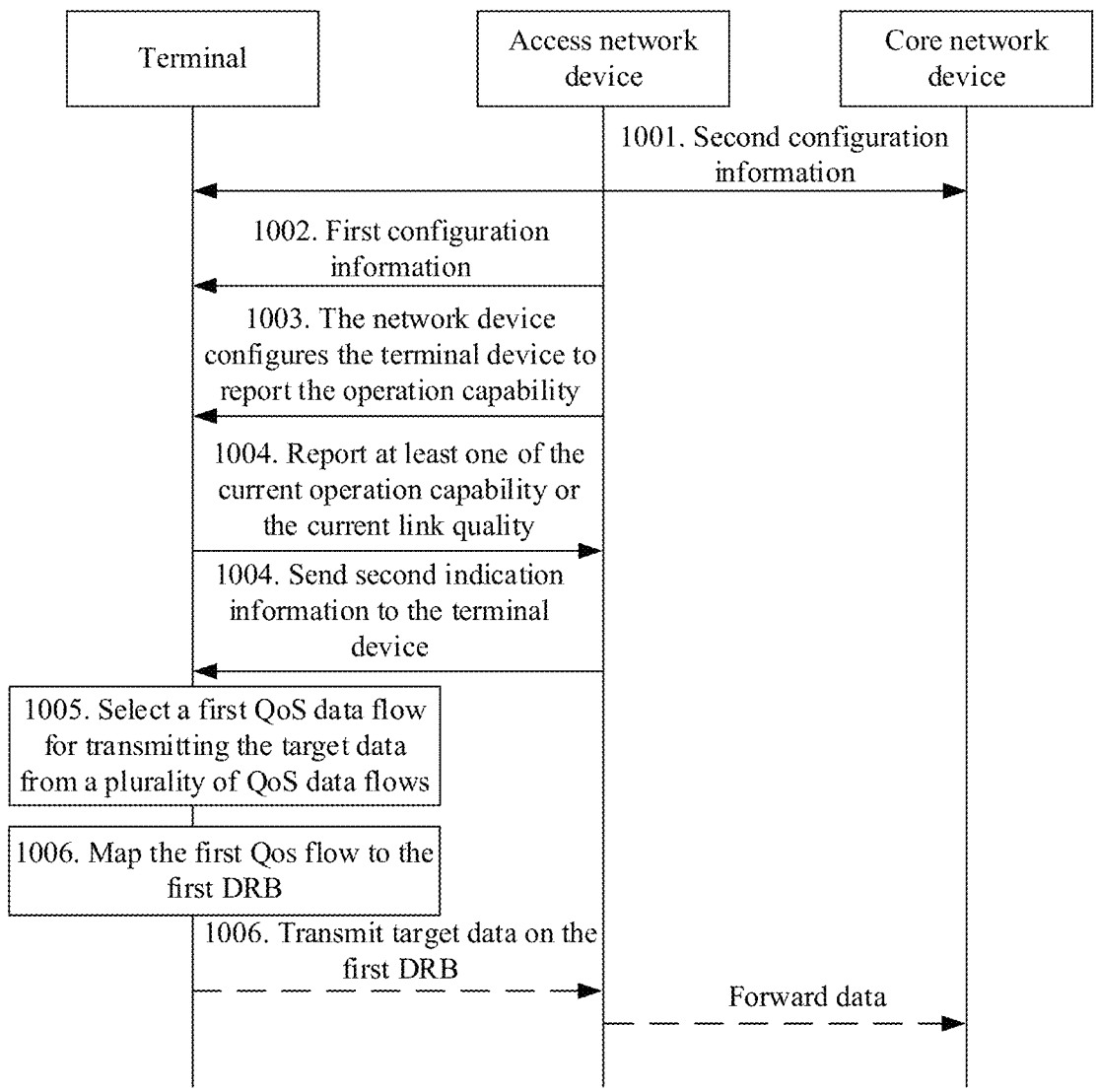
FIG. 10 is a fourth schematic flowchart of a method for transmitting data according to an embodiment of the present disclosure.

The example is described with reference to FIG. 10, which may include the following operations.

The operations 1001 and 1002 are the same as operations 81 and 82 of the first example, and are not described herein again.

At 1003, the network device configures the terminal device to report the operation capability.

Specifically, the network device may configure the terminal device to report the operation capability and the link quality.

For example, the gNB configures the terminal to report the operation capability. In the example, the description of the operation capability is the same as that in the foregoing first example, and details are not described again.

A manner of the reporting by the terminal device includes periodically reporting or reporting based on a threshold.

The periodically reporting may be that the network device configures a reporting period for the terminal device, and then the terminal device reports periodically according to the reporting period, or the terminal device may preset the reporting period.

The reporting based on the threshold includes one of reporting in response to that a threshold 1 (or a first threshold) is exceeded, or reporting in response to that a threshold 2 (or a second threshold) is not exceeded, or reporting in response to that the threshold 1 is exceeded and the threshold 2 is not exceeded, that is, reporting in response to that the first threshold is exceeded with no more than the second threshold. The first threshold is lower than the second threshold.

The configuration for reporting the link quality may include configuring, by the network device, a Radio Resource Management (RRM) measurement reporting parameter for the terminal device.

At 1004, the terminal device reports at least one of the current operation capability or the current link quality to the network device. The network device sends second indication information to the terminal device.

Correspondingly, the network device receives at least one of the current operation capability or the current link quality reported by the terminal device, and the terminal device receives the second indication information sent by the network device.

The second indication information indicates at least one of: the first data processing manner used by the terminal device; or the number N of layers processed the terminal device in the first data processing manner.

For example, the terminal device reports the current operation capability according to the configuration of the network. The network device (which may be a gNB and/or an Access and Mobility Management Function (AMF) and/or an SMF) determines the number of AI operation layers currently applicable to the terminal according to the operation capability reported by the terminal in combination with signal quality of the current serving cell, and indicates the number of AI operation layers to the UE.

The manner in which the terminal device obtains the at least one of the current operation capability or the current link quality is the same as that in the foregoing first example, and details are not described herein again.

The at least one of the current operation capability or the current link quality reported by the terminal device includes: at least one of data information of the current operation capability or a measurement result of the current link quality; or at least one of a capability range corresponding to the current operation capability or a measurement result interval corresponding to the current link quality.

Unlike the first example, the operation that the terminal device reports the at least one of the current operation capability or the current link quality includes the following operations.

At least one of data information of the operation capability or the measurement result of the link quality is reported, for example, the current remaining value of the memory capacity, the current remaining calculation capability of the CPU and the like.

Alternatively, at least one of the capability range corresponding to the current operation capability or the measurement result interval corresponding to the current link quality may be reported.

To be specific, the operation that the capability range corresponding to the current operation capability is reported can be an operation that the terminal device determines a capability level or capability range where the current operation capability is located according to a preset capability range table. For example, the capability range table includes capability ranges (or levels) 1, 2 and 3, which correspond to the memory capacity A-B, B-C and C-D, respectively. If the current memory capacity of the terminal device is n and is within the range A-B, the terminal device can only indicate that the current capability level or capability range is the capability range 1 in the reported information without reporting the complete operation capability information.

The measurement result interval of the current link quality may be a preset table of correspondences between measurement result values and measurement result intervals, similar to the foregoing. When reporting, the terminal device determines a measurement result interval according to the correspondences between the measurement result values and the measurement result intervals, and then reports the determined measurement result interval to the network device.

For another example, the second indication information may include one or more of AI model information and updated number of AI operation layers on the UE side.

The AI model information indicates, for example, the first data processing manner, i.e. indicating the use of AI model-1. In other words, the AI model information may include the type of neural network model used, and/or the version of the neural network model, and/or the identification of the neural network model, and/or the algorithm identification of the neural network model, and the like.

The updated number of AI operation layers on the UE side indicates that the number of layers processed by the terminal device in the first data processing manner is N.

The second indication information is carried by RRC signaling, an MAC CE, a PDCCH, a Non-Access Stratum (NAS) or an application layer message. Specifically, if the second indication information is indicated through the access layer, the signaling may be RRC signaling/a MAC CE/a PDCCH. If the second indication information is indicated by the AMF, the signaling may be a NAS message. If the second indication information is indicated by the SMF, the signaling may be an application layer message.

In this operation, the processing of the network device includes operations as follows.

The network device determines, according to the at least one of the current operation capability or the current link quality reported by the terminal device, the first data processing manner used by the terminal device or that the number of layers processed by the terminal device in the first data processing manner is N; and determines that the number of layers in the first data processing manner to be processed by the network device is M. M is an integer greater than or equal to 1, and the M layers do not overlap with the N layers.

That is, in response to determining the number of layers to be processed by the terminal device, the network device may also determine the number of layers to be processed by the network device in the current calculation. For example, the network device determines that the terminal device performs four-layer calculation (i.e., calculation from the first layer to the fourth layer) in the AI model-1. If the AI model-1 is the neural network model of ten layers, the network device can determine to perform six layers in the current processing, specifically calculation from the fifth layer to the tenth layer.

Then, the terminal device selects the first DRB from the plurality of DRBs according to the first data processing manner or the number N of layers processed by the terminal device in the first data processing manner contains in the second indication information, and first correspondences. The method further includes the following operations.

At 1005, the terminal device selects a first QoS data flow for transmitting the target data from a plurality of QoS data flows according to the first data processing manner or the number N of layers processed by the terminal device in the first data processing manner, and second correspondences.

The operation 1005 may be performed at the application layer of the terminal device. The second correspondences are obtained in the foregoing operation 1001. The specific contents thereof have been described in detail in the first example, and are not described herein again.

For example, the application layer of the terminal device determines, according to the received association relationship between the AI model and/or the number of AI operation layers and the QoS flows, a QoS flow for transmitting the updated AI operation result.

At 1006, the terminal device maps the first QoS data flow to the first DRB, and transmits target data on the first DRB.

This operation may be performed at the access layer of the terminal device.

For example, the access layer of the terminal device maps the QoS flow determined by the application layer to the DRB configured by the gNB, to complete the conversion of the DRB.

In addition, the related description for the mapping between the QoS data flows and the DRBs and the like in this example are the same as those in the first example, and therefore are not described again.

In a third example, the example differs from the foregoing two examples in that the first correspondences further include: a correspondence between each of the at least one DRB and one or more QoS parameters. Different DRBs correspond to different QoS parameters.

Correspondingly, the method further includes an operation that the terminal device selects a first QoS parameter for transmitting the target data from a plurality of QoS parameters according to the first data processing manner or the number N of layers processed by the terminal device in the first data processing manner, and third correspondences.

The plurality of QoS parameters correspond to a second QoS data flow.

The third correspondences may be included in the second configuration information, or may be configured separately. The third correspondences include a data processing manner corresponding to each of the plurality of QoS parameters, or the numbers of layers processed by the terminal device in the data processing manner corresponding to different QoS parameters.

Here, the contents contained in the QoS parameters have been described in the above example, and each of the QoS parameters in this example may refer to a QoS parameter group consisting of one or more QoS parameters. In other words, the third correspondences may be understood as a respective data processing manner corresponding to each QoS parameter group; or the number of layers processed by the terminal device in the data processing manner corresponding to each QoS parameter group.

Different QoS parameter groups correspond to different data processing manners, and different QoS parameter groups correspond to different numbers of layers processed by the terminal device in the data processing manner.

The method may further include an operation that the terminal device maps the second QoS data flow with the first QoS parameter to the first DRB.

For example, one QoS flow is configured for one AI model/task, and one QoS flow corresponds to multiple different QoS parameters (only one set of QoS parameters is activated at a certain time point) in this example. For example, the core network requires a base station to establish a certain QoS flow (for example, QoS flow id=1) carrying multiple sets of QoS parameters, and the base station establishes a plurality of DRBs (each corresponding to one set or multiple f sets of QoS parameters) corresponding to the same QoS flow (for example, the Qos flow may be referred to as a second QoS data flow in the example, of course, the second QoS data flow does not indicate that there are two available QoS data flows, but only a name indication). Subsequently, which DRB to switch to is triggered by the UE or the base station.

It should also be noted that the example may be performed in conjunction with some of the operations in the first example or the second example.

Separately, with reference to the first example, the configuration of the network device may be added in operation 81 and/or operation 82, including the foregoing third correspondences without changing other content. Operation 83 in the first example is then performed. The operation 84 in the first example that the terminal device determines to activate the first DRB and transmits target data on the first DRB is also executed in this example.

However, a difference from the first example in performing the operation 84 is the manner of determining the parameters of the QoS data flow mapped to the first DRB. In this example, the terminal device selects, according to the first data processing manner or that the number N of layers processed by the terminal device in the first data processing manner and the third correspondences, the first QoS parameter for transmitting the target data from the plurality of QoS parameters, and then the terminal device maps the second QoS data flow with the first QoS parameter to the first DRB.

The remaining part is the same as the first example, and is not described again.

With reference to the second example, the configuration of the network device may be added in operation 1001 and/or operation 1002, including the foregoing third correspondences, without changing other content.

Operation 1003 and operation 1004 may be the same as those in the second example, and details are not described again.

Operation 1005 and operation 1006 are different from those in the second example. Specifically, the terminal device selects a first QoS parameter for transmitting the target data from a plurality of QoS parameters according to the first data processing manner or the number N of layers processed by the terminal device in the first data processing manner and third correspondences. The plurality of QoS parameters correspond to a second QoS data flow. The terminal device then maps the second QoS data flow with the first QoS parameter to the first DRB, and transmits the target data on the first DRB. The specific processing has been described previously, and therefore is not repeated.

It can be seen that, with the above solution, one of the plurality of DRBs may be selected for transmitting the target data, and the first DRB can be selected based on the data processing manner in which the terminal device obtains the target data or the amount of data processed by the terminal device. In this way, the terminal device can quickly regulate to an appropriate DRB for data transmission according to the current processing condition, thereby quickly and conveniently meeting a transmission requirement at the terminal device side when the terminal performs data transmission especially in a scenario of big data processing.

Figure 11:
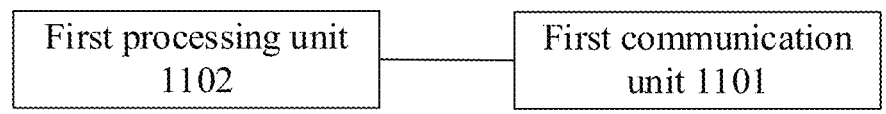
FIG. 11 is a schematic structural composition diagram of a terminal device according to an embodiment of the present disclosure.

An embodiment of the present disclosure provides a terminal device. As shown in FIG. 11, the terminal device includes a first processing unit 1102 and a first communication unit 1101.

The first processing unit 1102 is configured to determine to activate a first DRB.

The first communication unit 1101 is configured to transmit target data on the first DRB.

The first DRB is one of a plurality of DRBs.

The target data is data obtained by processing through the terminal device based on a first data processing manner, or data obtained by performing through the terminal device N layers processing in the first data processing manner. N is an integer greater than or equal to 1.

Figure 12:
FIG. 12 is a schematic structural composition diagram of a network device according to an embodiment of the present disclosure.

An embodiment of the present disclosure further provides a network device. As shown in FIG. 12, the network device includes a second communication unit 1201.

The second communication unit 1201 is configured to receive target data transmitted by a terminal device on a first DRB.

The first DRB is one of a plurality of DRBs.

The target data is data obtained by processing through the terminal device based on a first data processing manner, or data obtained by performing through the terminal device N layers processing in the first data processing manner. N is an integer greater than or equal to 1.

The terminal device described in the embodiment may be a terminal device capable of performing the first data processing manner, such as a neural network model (or calculation) or an AI model (or an AI algorithm). The network device may be a network-side access network device, such as a base station (a gNB, an eNB, etc.), or may be a core network device. Processing of different network devices are described below with reference to examples.

In the embodiment, the first data processing manner may be one of a plurality of data processing manners that can be performed by the terminal device Further, the data processing manner may be an AI algorithm or an ML model.

In the embodiment, the first data processing manner is determined according to at least one of a current operation capability or a current link quality of the terminal device or indicated by a network device. The number of layers processed by the terminal device in the first data processing manner is determined according to at least one of the current operation capability or the current link quality of the terminal device, or indicated by the network device.

That is, the first data processing manner or the number of layers processed by the terminal device in the first data processing manner may be determined by the terminal device or may be indicated by the network device.

The above two cases are described with reference to examples below.

In a first example, the terminal device determines the number of AI operation layers to activate the DRB.

The network device is a core network device, and the first communication unit 1101 of the terminal device receives second configuration information sent by the core network device. The second configuration information includes second correspondences.

The second correspondences at least include correspondences between the first data processing manner and one or more QoS data flows, and/or correspondences between different numbers of layers processed by the terminal device in the first data processing manner and different QoS data flows.

The network device is an access network device, and the first communication unit 1101 of the terminal device receives the first configuration information sent by the second communication unit 1201 of the network device (access network device). The first configuration information includes first correspondences.

The network device is the access network device.

The first correspondences include a correspondence between at least one DRB and related information of a data processing manner capable of being transmitted by the DRB; and/or a correspondence between the at least one DRB and the number of layers of processing in a data processing manner supported by the DRB.

In addition, the first correspondences may further include a correspondence between the at least one DRB and one or more QoS data flows. Different DRBs correspond to different QoS data flows.

The related information of the data processing manner (such as the AI model) includes at least one of: a type of a neural network model, such as a DNN, a RNN or a CNN; an algorithm identifier corresponding to the neural network model; service information corresponding to the neural network model, the service information may be a service identifier; or version information corresponding to the neural network model.

The number of operation layers on the terminal device side of the supported AI model may be one or more layers in the AI model. That is, the first correspondences may include that the number of layers processed by the terminal device in a data processing manner supported by a DRB is N, and N is greater than or equal to 1.

The first processing unit 1102 of the terminal device determines, according to at least one of a current operation capability or a current link quality, the first data processing manner or that a number of layers processed by the terminal device in the first data processing manner is N.

The first processing unit 1102 of the terminal device determines, on the application layer according to at least one of the current operation capability or the current link quality, the first data processing manner or that the number of layers processed by the terminal device in the first data processing manner is N, or the application layer of the terminal device sends, to the access layer, the first data processing manner or the number N of layers processed by the terminal device in the first data processing manner.

In addition, the first communication unit 1101 of the terminal device may send, to a network device, the first data processing manner or the number N of layers processed by the terminal device in the first data processing manner.

Accordingly, the second processing unit 1201 of the network device determines, according to the number N of layers processed by the terminal device in the first data processing manner, that the number of layers in the first data processing manner to be processed by the network device is M. M is an integer greater than or equal to 1, and the M layers do not overlap with the N layers.

The first processing unit 1102 of the terminal device determines to activate the first DRB. The first communication unit 1101 transmits the target data on the first DRB.

Specifically, the access layer on the terminal device side may perform the following two processing solutions according to the received first data processing manner or the number N of layers processed by the terminal device in the first data processing manner.

In a first solution, the first processing unit 1102 of the terminal device selects the first DRB from the plurality of DRBs according to the first data processing manner or the number N of layers processed by the terminal device in the first data processing manner, and first correspondences.

Further, the first communication unit of the terminal device sends third indication information to the network device, and the third indication information includes the first DRB to be activated selected by the terminal device.

The first indication information may be carried by dedicated signaling, for example, RRC dedicated signaling/an MAC CE/UCI, or the like.

It is understood that the activated first DRB is correlated to at least one of a current operation capability or a current link quality of the terminal device.

In a second solution, the first processing unit 1102 of the terminal device selects a candidate DRB from the plurality of DRBs according to the first data processing manner or the number N of layers processed by the terminal device in the first data processing manner, and first correspondences.

The first communication unit 1101 sends the candidate DRB to the network device.

The terminal device receives first indication information sent by the network device. The first indication information includes the first DRB, and the first indication information is carried by RRC signaling, an MAC CE, or a PDCCH.

In this operation, the network device may be an access network device.

In addition, the first DRB fed back by the network device may be the same as or different from the candidate DRB. The second processing unit 1202 of the network device may select the first DRB for the terminal device in combination with the current link quality or the like. Since the network device also has a processing capability and detects the link, the network device allocates a first DRB more suitable for the current communication condition to the terminal device.

Further, the example may further include: the first processing unit of the terminal device selects a first QoS data flow for transmitting the target data from a plurality of QoS data flows according to the first data processing manner or the number N of layers processed by the terminal device in the first data processing manner, and second correspondences.

The terminal device maps the first QoS data flow to the first DRB.

In a second example, the network side determines the number of AI layers.

A difference of the second example from the first example is that the second communication unit 1201 of the network device configures the terminal device to report the operation capability.

Specifically, the network device may configure the terminal device to report the operation capability and the link quality.

The first communication unit 1101 of the terminal device reports at least one of the current operation capability or the current link quality to the network device. The second communication unit 1201 of the network device sends second indication information to the terminal device.

Correspondingly, the second communication unit 1201 of the network device receives at least one of the current operation capability or the current link quality reported by the terminal device, and the terminal device receives the second indication information sent by the network device.

The second indication information indicates at least one of the first data processing manner used by the terminal device or the number N of layers processed by the terminal device in the first data processing manner.

The at least one of the current operation capability or the current link quality reported by the terminal device includes: at least one of data information of the current operation capability or a measurement result of the current link quality; or at least one of a capability range corresponding to the current operation capability or a measurement result interval corresponding to the current link quality.

The second processing unit 1202 of the network device determines, according to the at least one of the current operation capability or the current link quality reported by the terminal device, the first data processing manner used by the terminal device or that the number of layers processed by the terminal device in the first data processing manner is N; and determines that the number of layers in the first data processing manner to be processed by the network device is M. M is an integer greater than or equal to 1, and the M layers do not overlap with the N layers.

The first processing unit of the terminal device selects a first QoS data flow for transmitting the target data from a plurality of QoS data flows according to: the first data processing manner or the number N of layers processed by the terminal device in the first data processing manner, and second correspondences.

The first communication unit of the terminal device maps the first QoS data flow to the first DRB, and transmits target data on the first DRB.

In a third example, the example differs from the foregoing two examples in that the first correspondences further includes a correspondence between the at least one DRB and one or more QoS parameters. Different DRBs correspond to different QoS parameters.

Correspondingly, the first processing unit 1102 of the terminal device selects a first QoS parameter for transmitting the target data from a plurality of QoS parameters according to the first data processing manner or the number N of layers processed by the terminal device in the first data processing manner is N, and third correspondences.

The plurality of QoS parameters correspond to a second QoS data flow.

The third correspondences may be included in the second configuration information, or may be configured separately. The third correspondences include a data processing manner corresponding to each of the plurality of QoS parameters, or the numbers of layers processed by the terminal device in the data processing manner corresponding to different QoS parameters Further, the first communication unit of the terminal device maps the second QoS data flow with the first QoS parameter to the first DRB.

It can be seen that, with the above solution, one of the plurality of DRBs may be selected for transmitting the target data, and the first DRB can be selected based on the data processing manner of the terminal device or the amount of data processed by the terminal device. In this way, the terminal device can quickly regulate to an appropriate DRB for data transmission according to the current processing condition, thereby quickly and conveniently meeting a transmission requirement at the terminal device side when the terminal performs data transmission especially in a scenario of big data processing.

Figure 13:
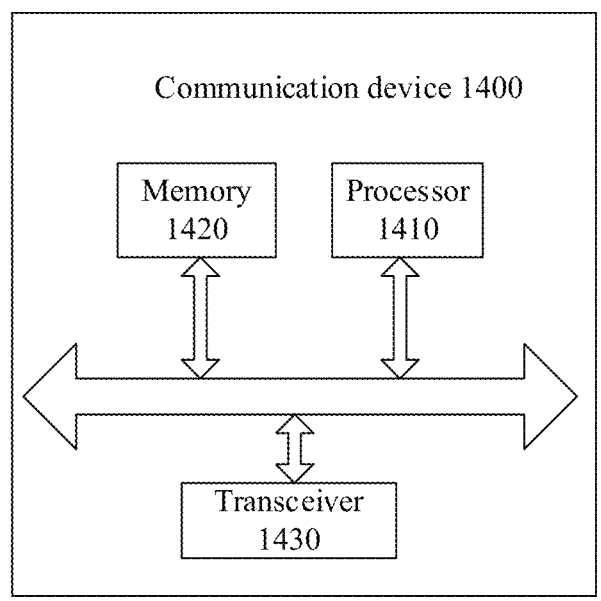
FIG. 13 is a schematic structural composition diagram of a communication device according to an embodiment of the present disclosure.

FIG. 13 is a schematic structural diagram of a communication device 1400 according to an embodiment of the present disclosure. The communication device in the embodiment may be the terminal device or the network device in the foregoing embodiments. The communication device 1400 shown in FIG. 13 includes a processor 1410 that may invoke and execute a computer program from a memory to implement the method in the embodiments of the present disclosure.

Optionally, as shown in FIG. 13, the communication device 1400 may further include a memory 1420. The processor 1410 may invoke and execute a computer program from the memory 1420 to implement the method in the embodiment of the present disclosure.

The memory 1420 may be a separate device independent of the processor 1410 or may be integrated into the processor 1410.

Optionally, as shown in FIG. 13, the communication device 1400 may further include a transceiver 1430 that may be controlled by the processor 1410 to communicate with other devices, in particular sending information or data to other devices, or receiving information or data sent by other devices.

The transceiver 1430 may include a transmitter and a receiver. The transceiver 1430 may further include an antenna(s). The number of antenna(s) may be one or more.

Optionally, the communication device 1400 may be a corresponding process implemented by the terminal device or the network device in the embodiments of the present disclosure. For brevity, details are not described herein.

Figure 14:
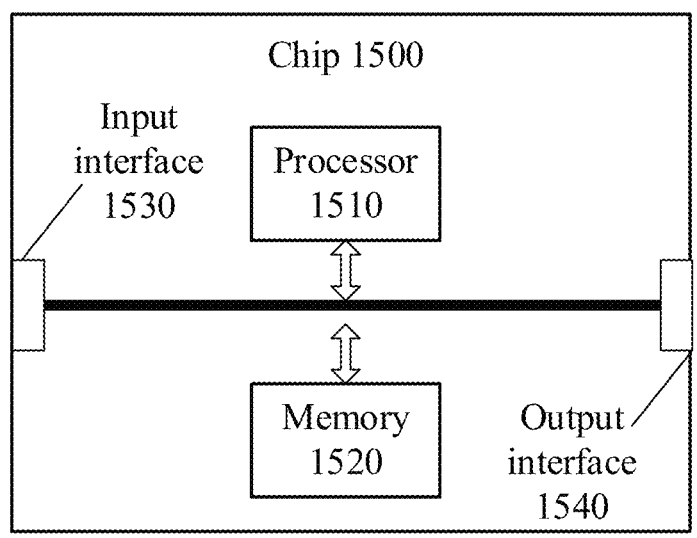
FIG. 14 is a schematic block diagram of a chip according to an embodiment of the present disclosure.

FIG. 14 is a schematic structural diagram of a chip according to an embodiment of the present disclosure. The chip 1500 shown in FIG. 14 includes a processor 1510 that may invoke and execute a computer program from a memory to implement the method of the embodiments of the present disclosure.

Optionally, as shown in FIG. 14, the chip 1500 may further include a memory 1520. The processor 1510 may invoke and execute a computer program from the memory 1520 to implement the method of the embodiments of the present disclosure.

The memory 1520 may be a separate device independent of the processor 1510 or may be integrated into the processor 1510.

Optionally, the chip 1500 may further include an input interface 1530. The processor 1510 may control the input interface 1530 to communicate with other devices or chips, and specifically, may obtain information or data transmitted by other devices or chips.

Optionally, the chip 1500 may further include an output interface 1540. The processor 1510 may control the output interface 1540 to communicate with other devices or chips, and specifically, may output information or data to other devices or chips.

Optionally, the chip may be applied to the processes implemented by the terminal device or the network device in the embodiment of the present disclosure. For brevity, details are not described herein.

It should be understood that the chip mentioned in the embodiments of the present disclosure may also be referred to as a system-level chip, a system chip, a chip system, or a system-on-chip.

It is to be understood that the processor in the embodiment of the disclosure may be an integrated circuit chip and has a signal processing capability. In an implementation process, the operations of the above method embodiment may be implemented by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component.

It will be appreciated that the memory in the embodiments of the present disclosure may be a volatile memory or a non-volatile memory, or may include both volatile and non-volatile memory. It should be noted that the memories of the systems and methods described herein are intended to include, but are not limited to, memories of these and any other proper types.

It should be understood that the memory is exemplarily but unlimitedly described. For example, the memory in the embodiments of the present disclosure may also be a Static Random Access Memory (SRAM), a Dynamic Random Access Memory (DRAM), a Synchronous DRAM (SDRAM), a Double Data Rate SDRAM (DDR SDRAM), an Enhanced SDRAM (ESDRAM), a Synchronous Link DRAM (SLDRAM), a Direct Rambus Random Access Memory (DR RAM) and the like. That is, the memory in the embodiments of the disclosure is intended to include, but not limited to, memories of these and any other proper types.

Figure 15:
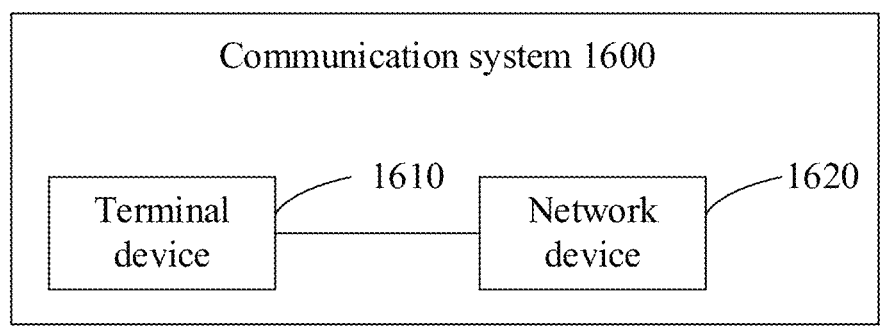
FIG. 15 is a second schematic diagram of architecture of a communication system according to an embodiment of the present disclosure.

FIG. 15 is a schematic block diagram of a communication system 1600 according to an embodiment of the present disclosure. As shown in FIG. 15, the communication system 1600 includes a terminal device 1610 and a network device 1620.

The network device 1610 may be used to implement the functions implemented by the communication device in the above methods, and the terminal 1620 may be used to implement the functions implemented by the terminal in the above methods. For brevity, details are not described herein.

The embodiment of the present disclosure further provides a computer-readable storage medium for storing a computer program.

Optionally, the computer-readable storage medium may be applied to the network device, the satellite, or the terminal device in the embodiments of the disclosure, and the computer program enables a computer to execute operations implemented by the network device in each method of the embodiments of the disclosure. For simplicity, elaborations are omitted herein.

An embodiment of the disclosure further provides a computer program product, which includes computer program instructions.

Optionally, the computer program product may be applied to the network device, the satellite, or the terminal device in the embodiments of the disclosure, and the computer program instruction enables a computer to execute operations implemented by the network device in each method of the embodiments of the disclosure. For simplicity, elaborations are omitted herein.

An embodiment of the disclosure further provides a computer program.

Optionally, the computer program may be applied to the network device, the satellite or the terminal device in the embodiments of the disclosure, and the computer program runs in a computer to enable the computer to execute operations implemented by the network device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not elaborated herein for convenient and brief description.

In some embodiments provided by the disclosure, it is to be understood that the disclosed system, device and method may be implemented in another manner. The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

When being realized in form of software functional unit and sold or used as an independent product, the function may also be stored in a computer-readable storage medium. Based on such an understanding, the substantial part of the technical solutions of the disclosure or parts there of making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The forgoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting data, comprising:
   determining, by a terminal device, to activate a first Data Radio Bearer (DRB), and transmitting target data on the first DRB,
   wherein the first DRB is one of a plurality of DRBs; and
   the target data is data obtained by processing through the terminal device based on a first data processing manner, or the target data is data obtained by processing, through the terminal device, N layers in the first data processing manner, wherein N is an integer greater than or equal to 1,
   wherein the first data processing manner is determined according to at least one of a current operation capability or a current link quality of the terminal device, or indicated by a network device; and/or
   a number of layers processed by the terminal device in the first data processing manner is determined according to at least one of the current operation capability or the current link quality of the terminal device, or indicated by the network device.

2. The method of claim 1, wherein the first DRB is related to at least one of the current operation capability or the current link quality of the terminal device.

3. The method of claim 1, further comprising:
   determining, by the terminal device, according to at least one of the current operation capability or the current link quality, the first data processing manner or that the number of layers processed by the terminal device in the first data processing manner is N.

4. The method of claim 3, wherein the determining, by the terminal device, according to at least one of the current operation capability or the current link quality, the first data processing manner or that the number of layers processed by the terminal device in the first data processing manner is N comprises:
  determining, by an application layer of the terminal device according to at least one of the current operation capability or the current link quality, the first data processing manner or that the number of layers processed by the terminal device in the first data processing manner is N; and
  sending, to an access layer by the application layer of the terminal device, the first data processing manner or the number N of layers processed by the terminal device in the first data processing manner.

5. The method of claim 3, further comprising:
  selecting, by the terminal device, the first DRB from the plurality of DRBs according to the first data processing manner or the number N of layers processed by the terminal device in the first data processing manner, and first correspondences.

6. The method of claim 3, further comprising:
  selecting, by the terminal device, a candidate DRB from the plurality of DRBs according to the first data processing manner or the number N of layers processed by the terminal device in the first data processing manner, and first correspondences;
  sending, by the terminal device, the candidate DRB to the network device; and
  receiving, by the terminal device, first indication information sent by the network device, wherein the first indication information comprises the first DRB, and the first indication information is carried by Radio Resource Control (RRC) signaling, a Medium Access Control Control Element (MAC CE), or a Physical Downlink Control Channel (PDCCH).

7. The method of claim 5, further comprising:
  receiving, by the terminal device, first configuration information sent by the network device, wherein the first configuration information comprises the first correspondences;
  wherein the network device is an access network device; and
  the first correspondences comprise at least one of: a correspondence between each of at least one DRB and related information of a data processing manner capable of being transmitted by the DRB; or a correspondence between each of the at least one DRB and a number of layers processed in a data processing manner supported by the DRB.

8. The method of claim 7, wherein the related information of the data processing manner comprises at least one of:
  a type of a neural network model;
  an algorithm identifier corresponding to the neural network model;
  service information corresponding to the neural network model; and
  version information corresponding to the neural network model.

9. The method of claim 7, further comprising:
  selecting, by the terminal device, a first QoS data flow for transmitting the target data from a plurality of QoS data flows according to: the first data processing manner or the number N of layers processed by the terminal device in the first data processing manner, and second correspondences.

10. A terminal device, comprising:
  a processor;
  a transceiver; and
  a memory for storing a computer program executable by the processor,
  wherein the processor is configured to invoke and execute the computer program stored in the memory to perform:
  determining to activate a first Data Radio Bearer (DRB); and
  controlling the transceiver to transmit target data on the first DRB,
  wherein the first DRB is one of a plurality of DRBs; and
  the target data is data obtained by processing through the terminal device based on a first data processing manner, or the target data is data obtained by processing, through the terminal device, N layers in the first data processing manner, wherein N is an integer greater than or equal to 1,
  wherein the first data processing manner is determined according to at least one of a current operation capability or a current link quality of the terminal device, or indicated by a network device; and/or
  a number of layers processed by the terminal device in the first data processing manner is determined according to at least one of the current operation capability or the current link quality of the terminal device, or indicated by the network device.

11. The terminal device of claim 10, wherein the first DRB is related to at least one of the current operation capability or the current link quality of the terminal device.

12. The terminal device of claim 10, wherein the processor is configured to invoke and execute the computer program stored in the memory to perform:
  determining, according to at least one of the current operation capability or the current link quality, the first data processing manner or that the number of layers processed by the terminal device in the first data processing manner is N.

13. The terminal device of claim 12, wherein the processor is configured to invoke and execute the computer program stored in the memory to perform:
  determining, by an application layer of the terminal device according to at least one of the current operation capability or the current link quality, the first data processing manner or that the number of layers processed by the terminal device in the first data processing manner is N; and
  controlling the transceiver to send, to an access layer by the application layer of the terminal device, the first data processing manner or the number N of layers processed by the terminal device in the first data processing manner.

14. The terminal device of claim 12, wherein the processor is configured to invoke and execute the computer program stored in the memory to perform:
  selecting the first DRB from the plurality of DRBs according to the first data processing manner or the number N of layers processed by the terminal device in the first data processing manner, and first correspondences.

15. The terminal device of claim 12, wherein the processor is configured to invoke and execute the computer program stored in the memory to perform:
  selecting a candidate DRB from the plurality of DRBs according to the first data processing manner or the number N of layers processed by the terminal device in the first data processing manner, and first correspondences;

controlling the transceiver to send the candidate DRB to the network device; and controlling the transceiver to receive first indication information sent by the network device, wherein the first indication information comprises the first DRB, and the first indication information is carried by Radio Resource Control (RRC) signaling, a Medium Access Control Control Element (MAC CE), or a Physical Downlink Control Channel (PDCCH).

16. The terminal device of claim 14, wherein the processor is configured to invoke and execute the computer program stored in the memory to perform:

controlling the transceiver to receive first configuration information sent by the network device, wherein the first configuration information comprises the first correspondences;

wherein the network device is an access network device; and the first correspondences comprise at least one of: a correspondence between each of at least one DRB and related information of a data processing manner capable of being transmitted by the DRB; or a correspondence between each of the at least one DRB and a number of layers processed in a data processing manner supported by the DRB.

17. The terminal device of claim 16, wherein the related information of the data processing manner comprises at least one of:

a type of a neural network model;

an algorithm identifier corresponding to the neural network model;

service information corresponding to the neural network model; and version information corresponding to the neural network model.

18. The terminal device of claim 16, wherein the processor is configured to invoke and execute the computer program stored in the memory to perform:

selecting a first QoS data flow for transmitting the target data from a plurality of QOS data flows according to: the first data processing manner or the number N of layers processed by the terminal device in the first data processing manner, and second correspondences.

* * * * *